Oct. 18, 1932.   F. J. PLYM   1,882,881
STORE FRONT CONSTRUCTION
Filed May 12, 1930   2 Sheets-Sheet 1

Inventor
Francis J. Plym
By Wallace R. Lane
Atty.

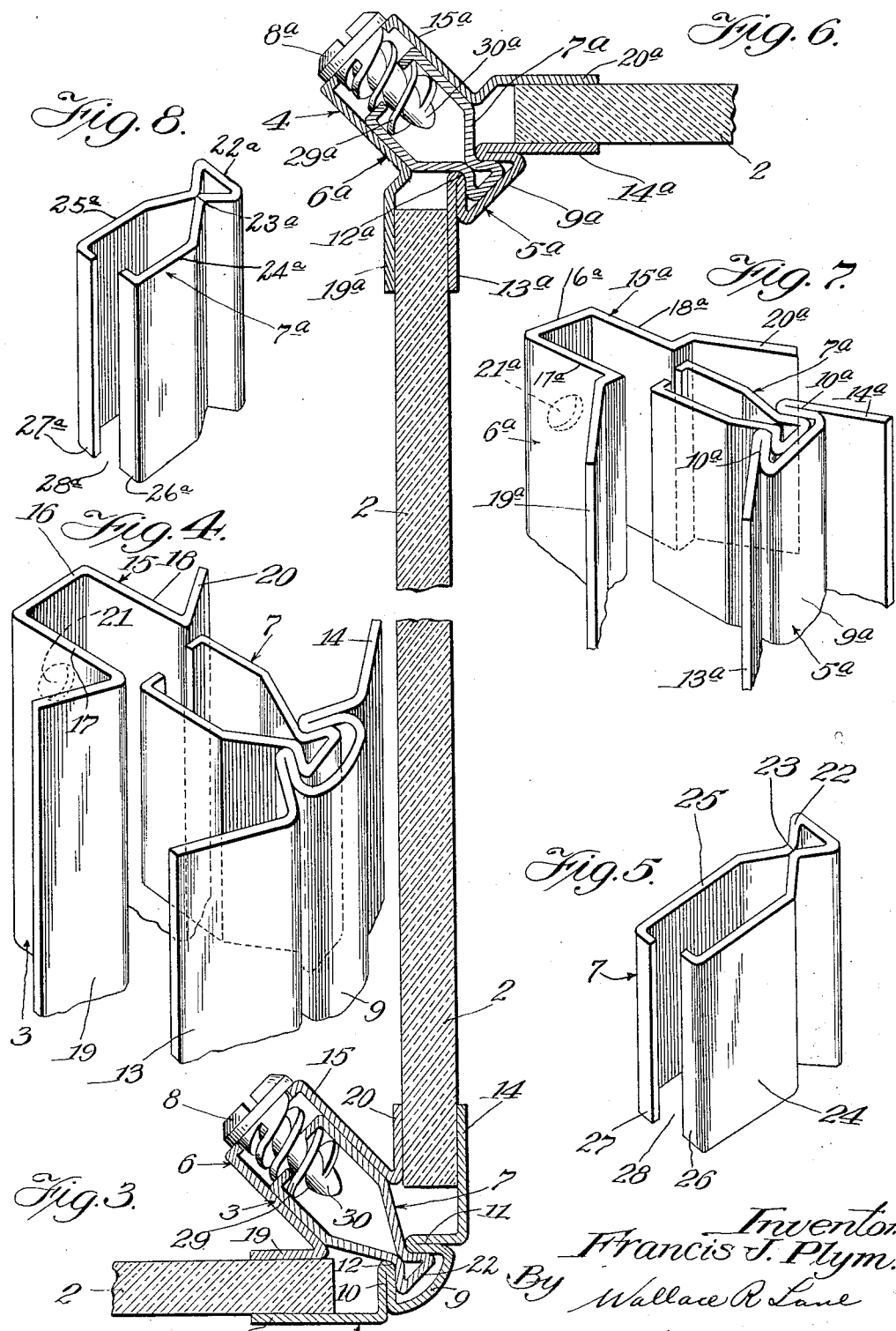

Patented Oct. 18, 1932

1,882,881

UNITED STATES PATENT OFFICE

FRANCIS J. PLYM, OF NILES, MICHIGAN, ASSIGNOR TO THE KAWNEER COMPANY, OF NILES, MICHIGAN, A CORPORATION OF MICHIGAN

STORE FRONT CONSTRUCTION

Application filed May 12, 1930. Serial No. 451,531.

The present invention relates to store front constructions, and more in particular to retaining or joining means for securing and positioning adjacent panes of glass.

Among the objects of the present invention is to provide a novel construction in a store front, or the like, whereby adjacent panes of glass or the like thereof, may be easily and readily secured together to provide a rigid and compact structure.

The invention comprehends the idea of providing a novel joining means or the like for adjacent panes or sections of glass or the like, in a store front construction, the joining means comprising structural elements adapted to firmly grip and secure the adjacent edges of these sections and to reenforce and strengthen the sections thereof, and to maintain the same in substantially their erected or set position.

Another object of the invention is to provide a novel glass retaining structure having glass retaining means or members adapted to grip the edge portions of the sections of glass of the store front construction firmly, the same being of a sufficiently resilient character to yieldably hold these edges, thus eliminating the possibility of setting up internal stresses and strains within the glass structure which might cause the pane to break, shatter or chip along the edges thereof.

The invention further comprehends the idea of providing novel means associated with the glass retaining members of the joining means in store front constructions, which serves to distribute the concentrated forces applied to the device at spaced intervals for drawing the same into engagement with the sections of glass, whereby such forces are transferred to said members over an increased area thereby diminishing the force per unit of area applied to the sections of glass by the gripping or contacting portions of these members. By the provision of such means, the uniformity of the gripping of these members with the glass sections is assured, and the glass is accordingly able to withstand the application of external forces, such as wind forces, pressure from objects lying against the same, and the like, without the same becoming chipped or cracked.

Another object of the invention is to provide a novelly constructed joining means in a store front construction, wherein the members or elements thereof are of such a construction that the same may be readily and easily assembled in place, and the adjacent sections of glass rigidly secured in position in a minimum of time. In an embodiment selected to illustrate the invention, one of the glass retaining members is provided with an elongated central recessed portion having the edges of the walls thereof spaced apart to provide an elongated opening. Intermediate or bracket members are provided at intervals, each of which has an enlarged beaded edge slidably engaging in this recessed portion, and which may be easily slid therealong to an aligned position with screw members provided in the other of the glass retaining members and at spaced intervals. These bracket members have flanged sides which are adapted to intercept adjacent threads of the screw member, which, when driven home, draws these glass retaining members into engagement with the sections of glass. Such simplicity of construction recommends itself where ease and ready setting of store front constructions is desired.

The invention further comprehends a novel store front construction, as above described, in which the sides of the novel bracket or intermediate member fit within and frictionally contact with the body portion of one of the glass retaining members, whereby a compact arrangement and assembly is provided, and which prevents lateral displacement and movement of the same within the glass retaining structure, as well as the entire structure itself.

Another object of the invention is to provide a novel glass retaining means in which the bracket or intermediate member is of novel construction and is provided with flanged sides, the flanges thereof being off-set in parallel planes sufficiently to provide a structure which will readily intercept with adjacent threads of the screw member, the screw member being likewise of novel construction and having threads of equal diameter and a forwardly extending part adapted to guide and align the same between the flanges of the bracket member.

Other objects, features, capabilities and advantages are comprehended by the invention, as will later appear, and as are inherently possessed thereby.

Referring to the drawings:

Fig. 3 is a fragmentary view in horizontal cross section taken in the plane represented by line 3—3 of Fig. 1 of the drawings, and disclosing the present novel construction in a corner bar of the store front construction.

Fig. 4 is a fragmentary view in perspective of the construction shown in Fig. 3 of the drawings, and showing the members of the present novel joining means spaced apart and in their relative positions prior to their assembly.

Fig. 5 is a view in perspective of the bracket or intermediate member in the present novel corner bar construction.

Fig. 6 is a fragmentary view in horizontal cross section taken in a plane similar to the plane represented by the line 3—3 of Fig. 1 of the drawings, but showing the present novel joining means in a reverse bar construction.

Fig. 7 is a fragmentary view in perspective of the construction shown in Fig. 6 of the drawings, and disclosing the members thereof in their relative positions prior to the assembly thereof.

Fig. 8 is a view in perspective of the bracket or intermediate member of the present novel reverse bar construction.

Figure 1:
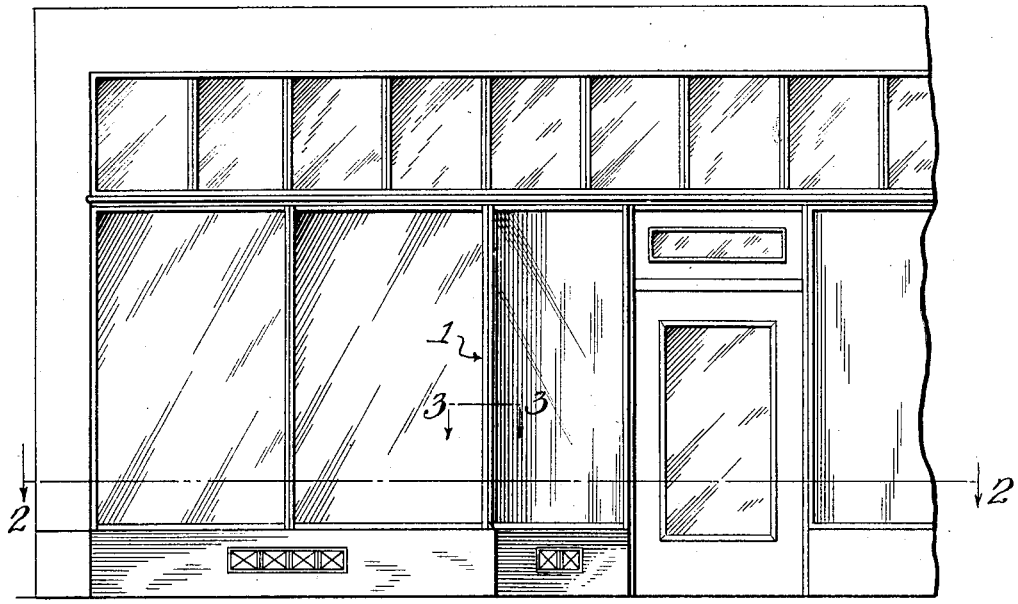
Fig. 1 is a fragmentary view in front elevation of a store front provided with the present novel glass retaining means.
Figure 2:
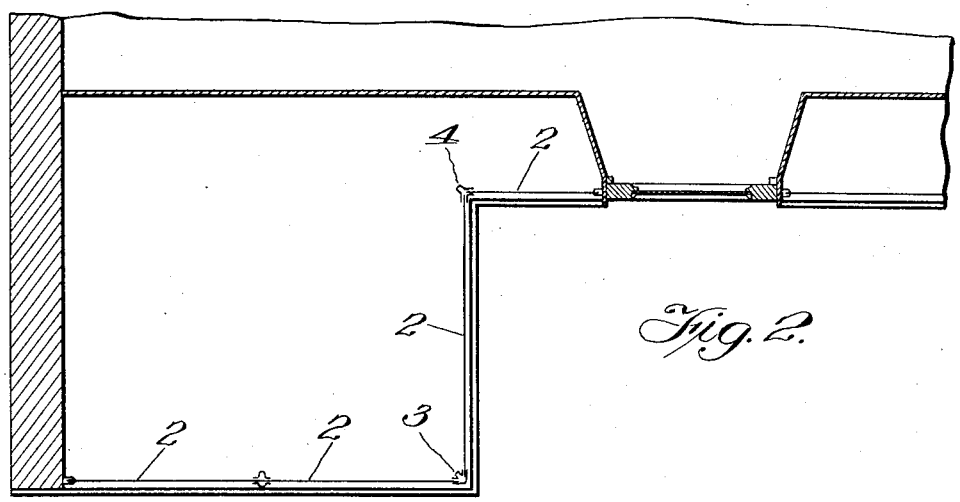
Fig. 2 is a view in horizontal cross section taken through the store front construction in a plane represented by the line 2—2 of Fig. 1 of the drawings.

Referring now more in detail to the drawings, embodiments selected to illustrate the invention are disclosed in a store front construction 1, the same being constructed and assembled from a plurality of adjacent sections of glass 2, two adjacent panes of glass having their edges secured by a retaining means 3, while certain other adjacent sections of glass have their edges secured by a retaining means 4, both to be presently described.

The present novel retaining means 3 and 4 are shown as being constructed in a proper shape to provide a suitable corner bar and reverse bar, respectively, in the store front construction, although it is to be understood that the same may be of suitable construction to provide a divisional bar or glass retaining means for adjacent sections of glass irrespective of the angular setting or disposition of the same, respectively, without departing from the spirit of the invention.

The corner bar construction 3 is shown as comprising an outer glass retaining member 5, an inner glass retaining member 6, and a bracket or intermediate member 7, a plurality of intermediate members being spaced along the construction, each of which engage with the outer member 5, and are in turn engaged by a screw member 8 in the inner member, likewise spaced at intervals along the inner member, and which members, when driven home, draw the inner and outer members into contacting engagement with the edges of the glass sections or panels 2 for firmly securing and positioning the same in the store front construction.

The outer retaining member 5 of the corner bar construction is shown as being formed from an elongated piece of sheet metal which is bent to form a central elongated recessed moulding 9, the piece of sheet metal being bent upon itself to form the side walls 10 and 11, the edges of which are spaced apart to provide an elongated slot or groove 12. The inner faces of the walls 10 and 11 provide shouldered portions adapted to be engaged by the intermediate member 7, to be later more fully explained. The edges of this piece of sheet metal are further bent to provide laterally extending arms or marginal portions 13 and 14 adapted to engage with and firmly, yet resiliently hold the outer faces of the adjacent sections of glass 2. The inner glass retaining member 6 is likewise shown as being formed from an elongated piece of sheet metal bent to provide a substantially U-shaped body portion 15, having the end wall 16, and side walls 17 and 18, these side walls being further bent laterally and outwardly to provide the flanges 19 and 20 adapted to contact with the inner faces of the edges of the adjacent glass sections 2, between which and the laterally extending portions 13 and 14 of the outer member 5 are the edges of the glass sections 2.

Spaced along and at intervals in the end wall 16 are provided apertures or openings 21 through which protrude the screw members 8 for engagement with the intermediate members or brackets 7 for drawing the inner and outer members 5 and 6 into engagement with the adjacent sections of glass 2.

The intermediate or bracket members 7 are formed from a piece of sheet metal, the central portion of which is bent to provide an enlarged beaded edge 22, the piece of sheet metal contacting as at 23, to provide a neck portion adapted to comfortably fit between the edges of the walls 10 and 11 forming the elongated slot 12 of the outer glass retaining member 5. The side portions of this sheet of metal are further bent diagonally outward from the neck portion 23, and parallel to one another to provide the side walls 24 and 25. Each of the side walls have their edges turned inwardly to provide the flanges 26 and 27, defining a longitudinal slot 28 therebetween. The side wall 25 extends beyond the side wall 24 and the flange 27 thereof is offset forwardly of the flange 26 and is disposed in a plane parallel thereto. The slot thus provided in the bracket members has its edges offset sufficiently whereby the same may conveniently intercept adjacent threads of the screw member 8.

This screw member 8 is provided with threads 29 of equal diameter which are spaced apart a distance substantially equal to the thickness of the metal of the intermediate member, whereby the edges of the flanges 26 and 27 are easily and readily engaged thereby when the same is driven home. The screw member 8 is further provided with a rounded extending shank end 30 adapted to guide and align the screw member in the slot 28.

When the members of this corner bar construction are in assembled position, the beaded edge of the intermediate members engage in the recessed portion 9, and is held therein by the shoulders or walls 10 and 11 thereof. These intermediate members extend rearwardly and fit within the inner member 6, the side walls 24 and 25 contacting with and frictionally engaging the walls 17 and 18 of this inner member, respectively, whereby a compact assembly is provided, as well as an arrangement which prevents lateral displacement of this intermediate member within the glass retaining structure, as likewise the entire structure itself.

In erecting this store front construction, the glass sections are set in place, as shown. Intermediate members are placed on the outer member at intervals, the same being slid in the recessed portion to a position opposite the apertures 21 of the inner member. The outer member is then placed in position, at which time the bracket members protrude inwardly between the edges of the glass section. The inner member is then placed over these brackets, screw members being inserted through the openings 21 which engage the edges of the slot 28 and which are then driven home. In view of the elongated slot 28 of the bracket members, a minute adjustment and alignment of the bracket members with the screw members is not necessary, but it is possible, without undue care in their positioning to place the same in a position whereby the screw members will intercept the same approximately between the ends thereof, which is preferable in order to equally distribute the forces over the edges of the glass section.

The reverse bar construction 4 is similar to the corner bar construction described above and as shown in Figs. 6, 7, and 8, the various elements and parts, accordingly, have been similarly designated, the members thereof being indicated as 5ª, 6ª, 7ª, etc. to correspond with the members 5, 6 and 7, etc. of the corner bar construction.

While I have herein described and upon the drawings shown illustrative embodiments of the invention, it is to be understood that the invention is not limited thereto, but may comprehend other constructions, arrangements of parts, details and features without departing from the spirit of the invention.

Having thus disclosed the invention, I claim:

1. In a store front construction, the combination of an inner and outer glass retaining member adapted to hold the edges of a pair of window panes therebetween, said outer member provided with a recessed portion intermediate its glass retaining portions, and an intermediate member engaging in said recessed portion and extending into said member, and a screw in said inner member adapted to engage with said intermediate member for drawing said members into engagement with said panes.

2. In a store front construction, the combination of an inner and outer glass retaining member adapted to hold the edges of a pair of window panes therebetween, said outer member provided with an elongated recessed portion intermediate the sides thereof, an intermediate member engaging in said recessed portion, said intermediate member provided with a longitudinally extending slot, and means in said inner member and engaging said slot for drawing said retaining members into engagement with said panes.

3. In a store front construction, the combination of an inner and outer glass retaining member adapted to hold the edges of a pair of window panes therebetween, said outer member provided with an elongated recessed portion, an intermediate member engaging in said recessed portion, said intermediate member having flanged sides, and means in said inner member adapted to engage with said flanges for drawing said retaining members into contacting engagement with said panes.

4. In a store front construction, the combination of an inner and outer glass retaining member adapted to hold the edges of a pair of window panes therebetween, said outer member provided with a recessed portion intermediate its glass retaining portions, an intermediate bracket member having an enlarged part engaging in said recessed portion, and means for drawing said inner and outer members into contacting engagement with said panes.

5. In a store front construction, the combination of an inner and outer glass retaining member adapted to hold the edges of a pair of window panes therebetween, said outer member provided with an elongated recessed portion, an intermediate member engaging in said recessed portion, said member having sides provided with off-set flanges, and means in said inner member adapted to engage with said flanges for drawing said retaining members into contacting engagement with said panes.

6. In a store front construction, the combination of an inner and outer glass retaining member adapted to hold the edges of a pair of window panes therebetween, an intermediate member engaging with said outer member, said intermediate member having flanged sides, and means in said inner member adapted to engage said flanges for drawing said retaining members into contacting engagement with said panes.

7. In a store front construction, the combination of an inner and outer glass retaining member adapted to hold the edges of a pair of window panes therebetween, an intermediate member engaging with said outer member, said intermediate member having flanged sides, and a screw member in said inner member adapted to engage the flanges of said sides between adjacent threads thereof for drawing said outer and inner members into engagement with said panes.

8. In a store front construction, the combination of an inner and outer glass retaining member adapted to hold the edges of a pair of window panes therebetween, an intermediate member engaging with said outer member, said intermediate member having flanged sides in contacting engagement with said inner member, and a screw member in said inner member adapted to engage the flanges of said sides for drawing said inner and outer members into engagement with said panes.

9. In a store front construction, the combination of an inner and outer glass retaining member adapted to hold the edges of a pair of window panes therebetween, said inner member having a channel shaped body portion, an intermediate member engaging said outer member, said intermediate member having flanged sides fitting within the body portion of said inner member, and means in said inner member adapted to engage with the flanges of said sides for drawing the inner and outer members into engagement with said panes.

10. In a store front construction, the combination of an inner and outer glass retaining member adapted to hold the edges of a pair of window panes therebetween, said outer member provided with an elongated recessed portion, an intermediate member engaging in said recessed portion, said inner member having a channel shaped body portion, said intermediate member having flanged sides fitting in the body portion of said inner member, and means in said inner member engaging the flanges of said sides for drawing said inner and outer members into engagement with said panes.

11. In a store front construction, the combination of an inner and outer glass retaining member adapted to hold the edges of a pair of window panes therebetween, said outer member having a central elongated recessed moulding part, an intermediate member having an enlarged edge engaging in said recessed moulding part, said intermediate member having sides frictionally fitting within said inner member, and means in said inner member adapted to engage with said intermediate member for drawing said inner and outer members into engagement with said panes.

12. In a store front construction provided with an inner and outer glass retaining member, a bracket member therefor comprising an enlarged edge, and flanged sides extending from said enlarged edge.

13. In a store front construction provided with an inner and outer glass retaining member, a bracket member therefor comprising a piece of sheet metal bent to form a central beaded edge, the side portions of said sheet being further bent to provide flanged edge portions defining an elongated slot therebetween.

14. In a store front construction provided with an inner and outer glass retaining member, a bracket member therefor comprising a piece of sheet metal bent to form a central beaded edge, the side of said sheet being further bent to provide parallel outer edge portions, said portions having their edges bent inwardly to form an elongated slot therebetween.

In witness whereof, I hereunto subscribe my name to this specification.

FRANCIS J. PLYM.

CERTIFICATE OF CORRECTION.

Patent No. 1,882,881.   October 18, 1932.

FRANCIS J. PLYM.

It is hereby certified that error appears in the printed specification of the above numbered patent requiring correction as follows: Page 3, line 84, claim 1, after "said" insert the word "inner", and line 87, after "said" insert the words "glass retaining"; and that the said Letters Patent should be read with these corrections therein that the same may conform to the record of the case in the Patent Office.

Signed and sealed this 27th day of December, A. D. 1932.

(Seal)

M. J. Moore,
Acting Commissioner of Patents.